Jan. 27, 1953 E. I. ANDERSON 2,627,022

COMBINED VIDEO GAIN AND FREQUENCY RESPONSE CONTROL

Filed June 22, 1948

INVENTOR
Earl I. Anderson
BY [signature]
ATTORNEY

Patented Jan. 27, 1953 2,627,022

UNITED STATES PATENT OFFICE 2,627,022

COMBINED VIDEO GAIN AND FREQUENCY RESPONSE CONTROL

Earl I. Anderson, Manhasset, N. Y., assignor to Radio Corporation of America, a corporation of Delaware Application June 22, 1948, Serial No. 34,373

6 Claims. (Cl. 250—20)

This invention relates to wave translating circuits applicable to radio receiving equipment, and more particularly to refinements in circuits for detecting and amplifying television signals.

The conventional type of present day radio receiver employed for the reception of commercial communication signals, in addition to the incorporation of a mechanism for manually controlling the overall gain of the radio receiver, usually includes some form of automatic gain control as well as some means for manually controlling the frequency response of that particular receiver circuit handling of the demodulated signal.

The advantages to be derived from proper automatic gain control action in radio wave receivers used for the reception of sound modulated signals, of course, have their counterpart in equipment designed to produce television images through the reception and detection of radio frequency television signals. In fact, fading or any other irregular signal strength variation of television signals commonly produce visible evidence in the reproduced image, which to the user may constitute considerably more annoyance than mere changes in audio level which result from variations in signal strength applied to sound broadcast receivers. Hence, a number of methods have been devised for applying automatic gain control (hereinafter referred to as A. G. C.) to television receivers and in their practice there have been established definite advantages in using a threshold type of control action.

In superheterodyne circuits employing second detectors of the simple diode variety, one of the more outstanding benefits to be derived from threshold A. G. C. is the realization of full receiver sensitivity during reception of very weak signals. Since the linearity of the diode detector is very poor for low operating voltages, it is considered desirable that a minimum signal voltage in the order of two to four volts be available at the output of the last intermediate frequency amplifier for satisfactory reception of any signal. With a threshold or "delayed" A. G. C. arrangement, no A. G. C. voltage is developed for reducing the sensitivity of the receiver until a signal in excess of a predetermined "threshold" value, necessary for the development of the required two to four volts by the stage driving the detector, is applied to the receiver terminals.

In television receivers, designed for the reception of negative transmission television signals, it is evident that any serious overload of the receiver circuit, due to excessive signal strengths, will tend to distort the video signal synchronizing information to produce consequent deleterious effects on sweep circuit synchronization. Accordingly, threshold A. G. C. offers another desirable feature in that it can be designed such that overloading of the last intermediate frequency amplifier is less likely to occur. To achieve this overload protection however, unless considerable A. G. C. gain is provided at a consequent additional cost of circuit construction, it is usually desirable to provide means for decreasing the A. G. C. threshold level when operating the receiver under higher signal strengths. Such a threshold decrease is most expeditiously accomplished on a manual basis.

In television receiver circuits having a pass band substantially less than the 4 mc., which the present R. M. A. system allows, experience has shown that a much "snappier" or "crisper" picture results if the overall response of the video circuit is not flat but made to rise with frequency. Furthermore, this rising frequency response may provide an apparent improvement in images representing the flat reproduction of a full 4 mc. band width when such an image is viewed at a distance of several feet away. This latter effect may be attributed to the falling off at high frequency of a good number of presently used camera tubes. However, the increased high frequency video response does tend to produce transients which manifestly sharpen all video detail in the reproduction of television images and, therefore, inclusion of high frequency video boost circuits in several present day television receivers has offered considerable improvement in image appearances. It must be noted, however, that the tilting of the video amplifier response to accentuate the higher frequencies, increases the apparent amount of noise in the picture since signal noise components are generally of a high frequency order. Thus the magnitude of high frequency boost is preferably made an increasing function of the received signal so that it is more effective when signals are strong and above the internally generated receiver noise, and reduced when receiving weaker signals.

In an embodiment of the present invention, there is provided a manually operative degenerative video amplifier gain control for a television receiver, and by novel circuit arrangements this self same mechanism is adapted to additionally provide a combined control over the receiver A. G. C. threshold level and the video amplifier high frequency accentuation, such that for high signal levels, the gain of the receiver may be manually reduced with simultaneous automatic and subsequent decrease in A. G. C. threshold level and increase the video high frequency response.

It is an object of this invention to provide a manual gain control for radio receivers employing restricted A. G. C. action, such that manipulation of said control acts to suitably vary the operating threshold of the A. G. C. system.

It is another object of this invention to provide a method of television receiver operation whereby a receiver may be made to exhibit improved response to received variations in signal strength and the economical incorporation of apparatus acting in accordance with this invention is permitted in present day television receivers.

It is still another object of the present invention to provide a degenerative manual gain control for television receivers which is of such form as to lend itself readily to the simultaneous control of the degree of frequency response alteration imparted to the receiver video amplifier for a given degree of established receiver gain, such that improved image appearance is realized for strong signal strength signals.

Another object of this invention resides in the provision of a form of manually operated video frequency amplifier gain and frequency response control in combination with A. G. C. threshold control, such that operation of the receiver at higher signal levels is enhanced by a reduction of video frequency amplifier gain which automatically effects an increase in the video amplifier high frequency response and an increase in the A. G. C. threshold level.

It is still another object of this invention to provide a form of television receiver video amplifier high frequency accentuation which is automatically varied and controlled by the television receiver manual gain control which is incorporated therein to supply the optimum amount of high frequency boost for any signal intensity.

Another purpose of this invention is to supply a form of degenerative manual gain control for radio receiving equipment employing restricted threshold A. G. C. action, such that the effective range of the demodulated signal amplifier manual gain control is substantially extended by means of its simultaneous and additional control over the A. G. C. threshold level.

Other objects and advantages of the present invention will become apparent, to those skilled in the art, from perusal of the following specification taken in connection with the related drawings, the figures of which are merely to be illustrative of preferred forms of the invention and not limited thereto:

Figures 1, 2, 3:
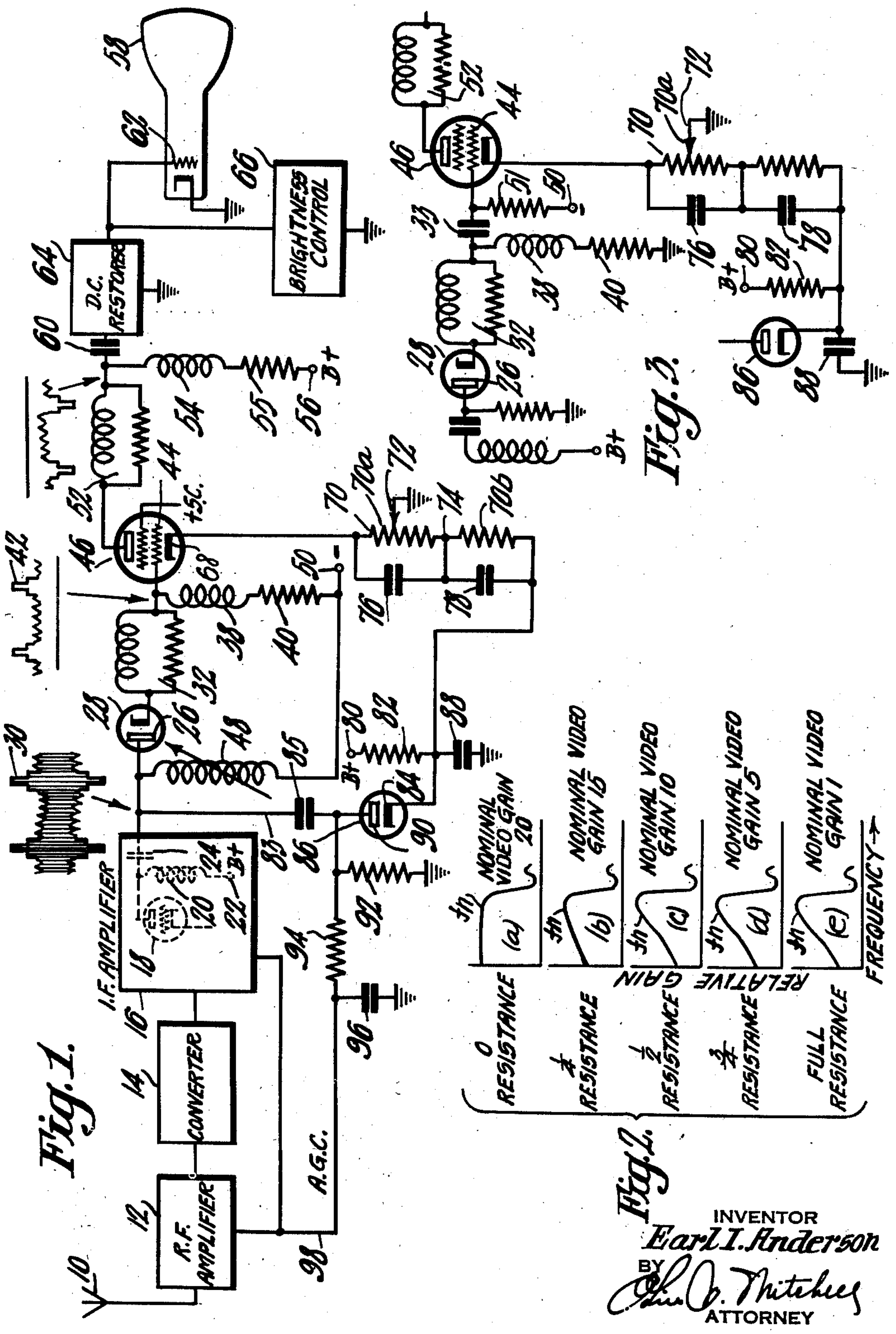
Figure 1 is a circuit and block representation of a television receiver employing the present invention.
Figure 2 is a graphical representation of the operating characteristics of that portion of a television receiver embodying the present invention.
Figure 3 is a schematic representation of another form of the present invention.

Referring now to Figure 1, there is shown a television receiver having an antenna 10, a radio frequency amplifier 12, a first detector 14 for converting the received radio frequency signal to a fixed intermediate frequency, and an intermediate frequency amplifier 16 including one or more stages of vacuum tube amplification. Circuit details of the intermediate frequency amplifier 16 are shown in part by the cutaway section of block 16 which discloses only the last stage of amplification employing vacuum tube 18 with its plate load 20 connected with a source of positive plate supply potential 22.

R. F. amplifier 12, converter 14, and I. F. amplifier 16 may, for example, take the form employed in the presently marketed television receivers shown and described in an article entitled "Television Receivers" published in the RCA Review for March 1947 on page 5.

The output of tube 18 is coupled through capacitor 24 to the anode 26 of the second detector diode 28. The signal 30 appearing on the anode 26 is demodulated by the diode 28 with its associated load impedances 32, 38, and 40 to supply the video modulation envelope shown at 42 to the grid 44 of video amplifier 46. A D. C. return peaking inductance 48 for the diode 28 is connected to the anode 26 thereof while bias potential for the control grid 44 of vacuum tube 46 is applied through the diode load elements 38 and 40 from the bias voltage source 50. The anode or output circuit of the video amplifier 46 conventionally includes inductances 52 and 54 which are suitably chosen to impart to the amplifier 46 substantially flat response to the highest video frequency reproduced, which is normally in the range of 3 to 4 mc. The operating plate potential for the vacuum tube 46 is supplied from a positive source having its terminal shown at 56. The video signal for the actuation of the kinescope 58 is derived from the compensating peaking network 52 and 54 through the capacitor 60, and is applied to the control grid 62 of the kinescope through the D. C. restorer circuit 64. Also connected with the control grid 62 of the kinescope 58 is a variable bias source 66 employed as an image brightness control.

Now examining in more detail the circuit configuration associated with the video amplifier vacuum tube 46, with which the present invention is more directly concerned, it is seen that the cathode 68 of the vacuum tube 46 is connected to ground through a portion 70A of the potentiometer 70 and the grounded adjustable tap 72 thereon. The potentiometer 70 also is provided with a fixed tap 74 to which is connected bypass condensers 76 and 78 acting across adjacent sections of the potentiometer. The function of these bypass condensers will be more clearly evident as the specification proceeds. The lower extremity of the potentiometer 70 is connected with a source of positive potential 80 through a dropping resistor 82, and is further connected to the cathode 84 of the A. G. C. diode 86. Filter condenser 88 is appropriately connected from the cathode 84 of the diode to ground to reduce any voltage fluctuations that tend to occur at that point. The anode 90 of the A. G. C. diode 86 is connected with the A. G. C. diode load 92 and its associated integrating network comprising resistor 94 and capacitor 96. These two elements of the integrating network are usually selected to have a time constant which allows substantially little discharge of the condenser 96 during one vertical field period. The voltage appearing across the storage condenser 96 may be conventionally connected with various radio frequency and intermediate frequency amplifier grid circuits as shown through A. G. C. bus 98 to supplement the bias applied to the receiver amplifier sections 12 and 16.

The A. G. C. system associated with diode 86 shown in this embodiment is of the double time constant type well known to the art, with the input time constant composed of C85 and R92 the value of this time constant being relatively short, usually in the order of 1 or 2 horizontal lines. Accordingly, the intermediate frequency signal applied to the second detector 28 is also applied through circuit path 83 and coupling condenser 85 to the anode 90 of the A. G. C. detector 86. As before described, the A. G. C. cathode 84 is connected to the low end of potentiometer 70 through section 70B to ground as provided by adjustable tap 72 thereon. Since a small value of bleeder current exists through the section 70B of the potentiometer due to its connection through resistor 82 to power supply voltage 80, it is apparent that the cathode 84 will be established at some positive potential above ground of a value which will be very nearly proportional to the value of the resistance 70B which is in turn determined by the position on the potentiometer of tap 72. Since the cathode 84 is above ground potential, and the diode is connected to conduct on positive peaks of signal 30, the tap 72 on the potentiometer 70, operates as a form of a variable bias control for the A. G. C. diode and hence provides a variable threshold control for the A. G. C. system. When the signal supplied by the I. F. amplifier 18 is sufficient in amplitude to cause conduction of the diode 86 there will, of course, be developed a voltage drop across resistor 92 due to diode current. Examination will show that this voltage drop is in the proper direction to cause the A. G. C. bus 98 to assume increasingly negative potential value with respect to ground as the signal intensity applied to the diode 86 increases. In accordance with well known A. G. C. system action, this increase in negative voltage on A. G. C. bus 98 resulting from an increase in signal amplitude, tends to reduce the gain of the various amplifier sections connected to the A. G. C. bus, thereby tending to minimize the voltage fluctuations at the output of the I. F. amplifier which occur due to variations in the signal strength applied to the R. F. amplifier 12.

Potentiometer 70 not only acts as a variable threshold control for the A. G. C. diode 86 but since its upper extremity 70A is connected with the cathode 68 of the video amplifier 46, the grounded adjustable tap 72 also acts to control the amount of resistance in the cathode circuit common to the grid circuit, which in turn establishes the degree of degeneration applied to the video amplifier tube 46. Thus, as the tap 72 is moved upwardly on the section 70A of the potentiometer 70, the resistance in the cathode circuit tends to decrease, thereby decreasing the percentage of degeneration and increasing the gain of the video amplifier stage. This increase of gain, however, also is attended by an increase of the value of resistance 70B following the change of tap 72 and hence increases the value of threshold voltage applied to the A. G. C. diode 86. Therefore, under the condition of restricted A. G. C. action such, for example, as would be provided by diode 86, a sufficient increase in signal intensity applied to the R. F. amplifier 12 will visibly cause an increase in picture contrast as viewed on kinescope 58, although such a change will be limited in extent by the A. G. C. action. It will, therefore, be necessary to decrease the gain of the video amplifier stage 46 and in so doing tap 72 will be moved downwardly so as to increase the degeneration in the cathode circuit; and as described, will automatically decrease the amount of A. G. C. threshold control voltage which, of course, is desirable in order to reduce the tendency of overload existing at the last I. F. amplifier 18.

It may be further noticed that the combination action of the degenerative volume control and threshold control tends to expand the range of the control action supplied by the potentiometer 70 over that realizable if the potentiometer were connected solely as a degenerative control. This action is reconciled by observing in the previous example cited that the manipulation of tap 72 such as to reduce the gain of video amplifier 46 by increasing the degeneration in the cathode circuit thereof, also decreases the threshold voltage applied to the diode 86, which in turn, for a given signal peak to peak amplitude applied to the R. F. amplifier 12 will produce an increase in negative A. G. C. control voltage which further acts to reduce the overall gain of the television receiver. The reverse of this action obtains when tap 72 is adjusted to increase the gain of the receiver.

The potentiometer 70 also serves in another capacity in cooperation with bypass condensers 76 and 78, namely that of a degenerative form of variable high frequency boost arrangement.

Figure 2 shows a number of frequency response curves for the video amplifier 46 under operating conditions corresponding to various positions of tap 72 on the resistor 70. Figure 2*a* shows the frequency response to be quite flat for the adjustment of potentiometer 70 to yield maximum gain for the video amplifier stage. Maximum gain, of course, is to be realized when the tap 72 is positioned at the upper extremity of the potentiometer so as to directly connect the cathode 68 to ground potential, thereby imposing a minimum of degeneration, and such a position may be said to correspond effectively to "zero resistance" position of the potentiometer 70. Operation under these conditions would correspond to necessary receiver operation when under the influence of extremely weak signals, and as such, provides no high frequency boost due to the probability of an overall decrease in signal noise ratio. As the tap 72 of potentiometer 70 is moved downwardly so as to increase the degeneration and decrease the gain of the receiver, the frequency response characteristics of the video amplifier approach that shown in Figure 2*b*. Here there is evidenced a slight drop in low frequency response with an effective rise in high frequency response due to the lower impedance of capacitor 76 at higher frequencies which provides less degeneration at the higher frequencies. The response curve shown in Figure 2*b* is approximately that obtained when tap 72 is positioned to include about one-quarter of resistor 70 in a cathode circuit of the vacuum tube 46. Figure 2*c* shows the frequency response characteristic for the video amplifier when tap 72 is positioned to the fixed tap of potentiometer 70 and very closely represents the maximum high frequency boost obtainable with this arrangement since the time constant of condenser 76 and the upper fixed section of potentiometer 70 is preferably made the same as the time constant of the series value of the condensers 76 and 78 in combination with the total resistance of potentiometer 70. Since this is true, positioning of tap 72 at any point on the potentiometer more distant from the cathode 68 than the fixed tap 74, merely decreases the gain of the video stage with little noticeable change in frequency response characteristics. This effect is borne out by experimentally derived frequency response curves 2d and 2e.

The second detector arrangement described in connection with Figure 1 employs a D. C. connection between the second detector 28 and the video amplifier control grid 44. Under these particular conditions a further advantage realized from the present invention, as shown in connection therewith, is that of suitable compensation for changes in grid 44 operating bias as the signal strength, and consequently the diode current of diode 28 changes. It is apparent from the connections shown that as the signal strength increases with the subsequent increase in the diode current through resistor 40, the grid 44 will tend to become biased more positively and hence change the operating bias on the grid 44 in the direction of plate current saturation, which if allowed to proceed unchecked would impose serious distortion on the television synchronizing pulses. However the potentiometer 70 is further arranged so that the increase in signal will be not only compensated by a manual controlled degenerative reduction in gain of the vacuum tube 46 but also as tap 72 is moved in a direction away from the cathode 68 an increase in negative operating bias is provided so as to maintain the grid 44 operating point in a more desirable position of the tube plate current characteristics.

If a D. C. connection from the second detector to the first video amplifier is not desired, the present invention may still be practiced as shown in Figure 3 where like elements are assigned like numerical designation. The only difference in the operation of the arrangement from that shown in Figure 1 lies in the supply of a fixed bias potential to the video amplifier control grid 44 through a resistor 51 connected between said grid and a negative bias supply terminal 50. The operation of the present invention to provide a combination control of video amplifier gain, video amplifier, frequency response, and A. G. C. threshold voltage remains unchanged. However, as is apparent, adjustment of potentiometer 70 no longer serves to more closely maintain a predetermined grid operating point in tube 46 due to the A. C. coupling of the detector 28 to the grid 44 through coupling condenser 33.

In an experimental setup in which the highest video frequency of interest was 3 mc. the following values were assigned the parameters shown in Figure 1:

| | |
|---|---|
| **18** | 6AU6. |
| **22** | +150 volts. |
| **24** | 100 $\mu\mu$f. |
| **85** | 470 $\mu\mu$f. |
| **86** | 6AL5. |
| **92** | 100,000 ohms. |
| **94** | 2 megohms. |
| **96** | .05 $\mu$f. |
| **80** | +150 volts. |
| **82** | 82,000 ohms. |
| **33** | 333 ohms. |
| **76** | 270 $\mu$f. |
| **78** | 270 $\mu$f. |
| **70** | 1,500 ohms, center tapped. |
| **28** | 6AL5. |
| **40** | 82,000 ohms. |
| **50** | —2.5 volts. |
| **46** | 6AC7. |
| **55** | 56,000 ohms. |

It was from this experimental arrangement that the data constituting the basis for the curves of Figure 2 were obtained. In the curves the designation $fn$ represents the 3 mc. maximum which the system was designed to handle.

From the foregoing description of the method, practice and operation of the present invention, it is seen that the applicant has provided a novel form of single combination control for superheterodyne radio receivers employing restricted A. G. C. action said control offering simultaneous manual adjustment of the frequency response characteristics of the receiver, the automatic gain control threshold bias, and the overall gain of the receiver; and varies these characteristics in such a way as to provide improved receiver performance.

What is claimed is:

1. An electrical circuit for application in superheterodyne television receivers, said circuit comprising a first diode connected for second detector operation, a second diode connected to said detector for variable threshold automatic gain control voltage rectification, a tube having a control grid and a cathode connected for operation as a first video amplifier stage, a direct current circuit path from said first diode to said control grid, a potentiometer, a load circuit for said second diode connected for developing a variable A. G. C. voltage including a section of said potentiometer connected between said tube cathode and said second diode, and an electrical connection connecting the adjustable tap of said potentiometer with ground potential to define said section.

2. An electrical gain control circuit for application in superheterodyne television receivers, said circuit comprising a first diode connected for second detector operation, a second diode connected with said first diode for variable threshold automatic gain control voltage rectification, a vacuum tube having a control grid and a cathode connected for operation as a video amplifier stage, a direct current circuit path from said first diode to said vacuum tube control grid, a load circuit for said second diode connected for developing a variable A. G. C. voltage, a potentiometer having a fixed tap midway to its extremities and a variable tap thereon, said potentiometer being coupled between said vacuum tube cathode and said second diode in said load circuit, an electrical circuit connecting said potentiometer adjustable tap with a point of fixed potential, a first electrical impedance connected to partially bypass video signals from one extremity of said potentiometer to the fixed tap thereon, and a second similar electrical impedance connected from the other extremity of potentiometer to the fixed tap thereon.

3. An electrical circuit for application in a superheterodyne type television receiver, said circuit comprising a source of ground referenced positive voltage, a first diode connected for second detector operation in said television receiver, an intermediate frequency amplifier stage connected for supplying signal energy to said diode, a second diode and load circuit therefor connected to said first diode for providing variable threshold automatic gain control voltage, an amplifier having a control grid and a cathode adapted for operation as a video amplifier stage, a potentiometer with a grounded variable tap connected in said load circuit, a direct current circuit connection between said tube cathode and said second diode, including said potentiometer, an electrical connection between said power supply source and a first terminal of said potentiometer, and a capacitor connected between a second terminal of said potentiometer and ground potential.

4. In a superheterodyne radio receiver, an intermediate frequency amplifier, a second detector connected with the output of said intermediate frequency amplifier, a unilateral current conduction device connected to receive energy from said intermediate frequency amplifier, a load circuit connected with said unilateral conduction device for developing a voltage proportional to the peak amplitude of the intermediate frequency wave delivered by said intermediate frequency amplifier to said unilateral conduction device, a tube having at least a control grid and a cathode, said control grid being connected for excitation from a demodulated signal derived from said second detector, a potentiometer connected between said tube cathode and said unilateral current conduction device, said potentiometer having a fixed tap intermediate between its extremities, a first capacitor connected between one potentiometer extremity and said fixed tap, a second capacitor connected between the other potentiometer extremity and said fixed tap, said potentiometer being further provided with an adjustable tap disposed for manually adjustable location at any position intermediate between said potentiometer extremities, an electrical circuit path connecting said adjustable tap with ground potential, a resistance connecting one extremity of said potentiometer with a source of positive direct current potential and an electrical connection between said vacuum tube cathode and said other extremity of said potentiometer, said capacitors connected from the opposite extremities of said potentiometer to said fixed tap being of such value as to partially by pass high frequency signals appearing at said cathode.

5. An electrical circuit for application in superheterodyne television receivers, said circuit comprising a first diode connected for second detector operation in said television receiver, a second diode connected for variable threshold automatic gain control voltage rectification, said second diode having an anode and a cathode, a tube having a control grid and a cathode adapted for operation as a first video amplifier stage, a direct current connection between said control grid and said first diode, a potentiometer having a fixed tap intermediate to its extremities and an adjustable tap thereon, said potentiometer being connected in the cathode circuit of said tube, an electrical connection from said second diode to said potentiometer, and a circuit path from said potentiometer adjustable tap to ground.

6. In a superheterodyne radio receiving system the combination comprising: an intermediate frequency amplifier stage, a detector coupled to the output of said stage, an amplifier coupled to the output of said detector, rectifying means, means to apply a signal wave to said rectifying means, means to apply the rectified voltage from said rectifying means to said intermediate frequency stage as an automatic gain control voltage, voltage means to delay the action of said rectifying means, manual means to vary the gain of said amplifier, means for developing a voltage dependent on the gain of said amplifier, said manual means also varying said developed voltage and means for applying said developed voltage to change said delay voltage.

EARL I. ANDERSON.

REFERENCES CITED

The following references are of record in the file of this patent:

UNITED STATES PATENTS

| Number | Name | Date |
|---|---|---|
| 2,093,548 | Chittick et al. | Sept. 21, 1937 |
| 2,094,092 | Beers | Sept. 28, 1937 |
| 2,121,427 | Fowler | June 21, 1938 |
| 2,240,600 | Applegarth | May 6, 1941 |
| 2,241,553 | Kallman et al. | May 13, 1941 |
| 2,259,998 | Brown | Oct. 21, 1941 |
| 2,331,708 | Maynard | Oct. 12, 1943 |
| 2,355,701 | Bradley | Aug. 15, 1944 |
| 2,358,325 | Fyler | Sept. 19, 1944 |
| 2,369,066 | Maxwell | Feb. 6, 1945 |
| 2,402,096 | Somers | June 11, 1946 |

FOREIGN PATENTS

| Number | Country | Date |
|---|---|---|
| 515,426 | Great Britain | Dec. 5, 1939 |